Nov. 19, 1968   H. GRABNER ET AL   3,411,654
LIQUID STORAGE TANK INSTALLATION
Filed July 29, 1966   2 Sheets-Sheet 1

INVENTORS.
HERBERT GRABNER
KARL SCHWARZ
BY
Kurt Kelman
AGENT

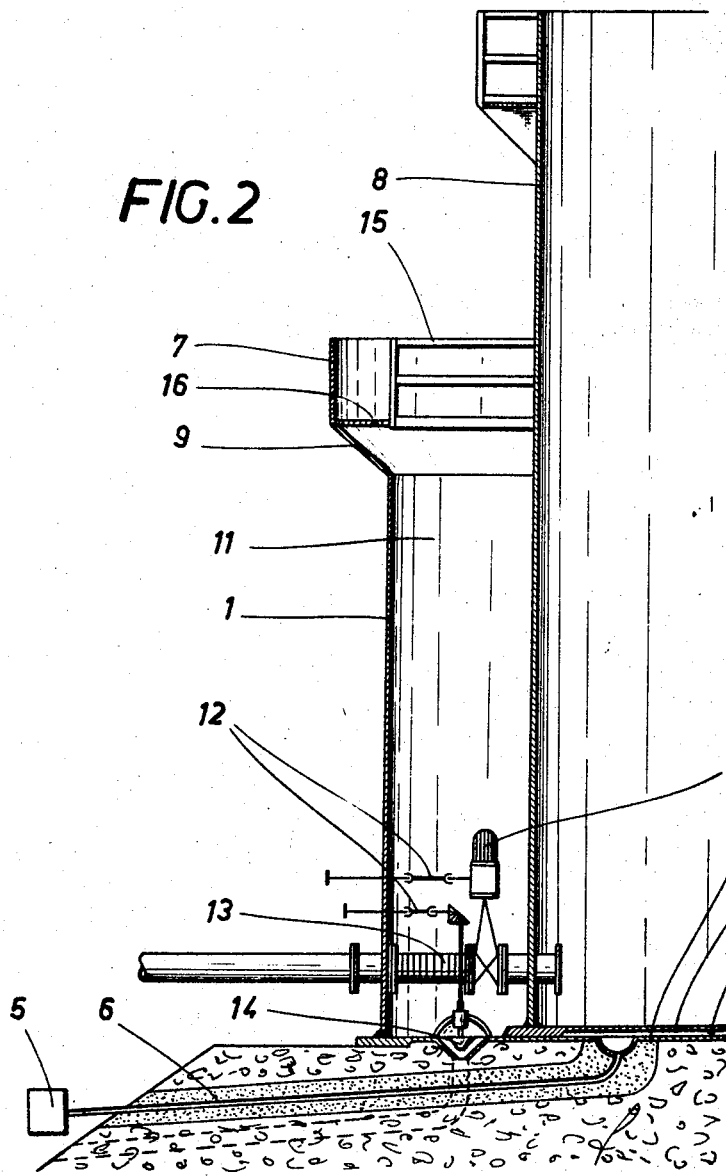

3,411,654
LIQUID STORAGE TANK INSTALLATION
Herbert Grabner, Vienna, and Karl Schwarz, Linz, Austria, assignors to Vereinigte Osterreichische Eisen- und Stahlwerke Aktiengesellschaft, Linz, Austria
Filed July 29, 1966, Ser. No. 568,518
Claims priority, application Austria, Aug. 3, 1965, A 7,149/65; Nov. 18, 1965, A 10,371/65
9 Claims. (Cl. 220—1)

ABSTRACT OF THE DISCLOSURE

A storage installation for flammable liquids in which a steel tank is arranged in a pan having a steel bottom and an annular upright steel wall spacedly surrounding the tank. The periphery of the tank bottom is spacedly sealed to the pan bottom by a peripheral weld, and the cavity so formed is connected to a leakage detector. A hollow annular float between the tank and upright wall of the pan restricts the area of a potential fire in liquid leaking laterally from the tank.

---

This invention relates to a shield for liquid storage tanks having a large capacity for crude oil and refined petroleum products. This shield comprises an open-topped barrier, which is spaced around the shell of the tank and defines around the tank a space for receiving any leakage. In some known shields, the barrier is formed by earth walls, which are made liquid-tight by various means. For instance, the barrier may be lined with tar-concrete. More recent methods use plastic liners for the tanks and earth embankments. The tightness of the known structures is endangered by cracks caused by settling of the ground.

The disadvantages of the known shields can be avoided according to the invention by the use of a barrier or shield which consists of metal, particularly of welded steel. This barrier makes economical use of valuable industrial area because it can be built higher than earth walls and concrete troughs so that for a given capacity of the annular space between the barrier and the tank the barrier can be more closely spaced from the tank to be shielded. Compared to conventional structures, the expenditure of pipelines and cables is reduced by about 20–25%. The shield according to the invention also protects the tank against direct radiation from the sun for better control of the temperature and density of the contents of the tank. The operation and maintenance costs for the shield according to the invention are lower than with known shields. The tank is protected against underground water because the shield of the invention is not subject to cracks due to soil settlement and to frost. As the metal barrier may be relatively close to the shell of the tank, the potential annular fire area between the tank shell and the barrier is reduced.

A non-combustible float may cover a major portion of the potential annular fire area so that the fire risk is further reduced.

Further features of the invention will become apparent from the following description of a preferred embodiment of the invention and the accompanying drawing.

FIG. 2 is a fragmentary, sectional view of the tank and the barrier of FIG. 1.

Figure 1:
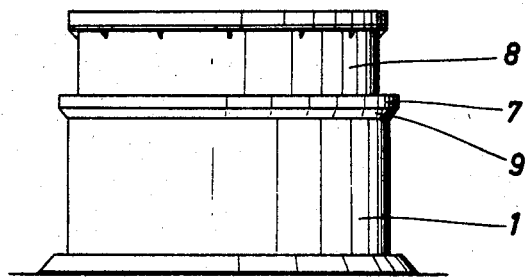
FIG. 1 is an elevation showing a large liquid storage tank provided with the shield or barrier according to the invention.

The tank 8 shown in FIGS. 1 and 2 may have a capacity of 5000 to 100,000 cubic meters. It is surrounded by a metal barrier 1 at a distance of preferably 1 to 1.5 meters. For a given height of the barrier 1, the distance between the barrier and the shell of the tank may be selected to provide the necessary capacity of the annular space 11 between the tank 8 and the barrier 1. This space should be as narrow as possible, but should permit inspection from above. The barrier 1 is made from welded steel. It rises from a solid metal underfloor 2, which also supports the tank bottom 3. The latter is sealed to the underfloor 2 by a weld around the periphery of the tank bottom 3. A conduit 6 leading to a leak indicating device 5, known per se, communicates with the cavity 4 between the tank bottom 3 and the underfloor 2.

The top of the barrier 1 carries a peripheral shroud 7, which forms a wind shield, and whose distance from the tank 8 exceeds the distance of the barrier 1 from the tank 8. The shroud 7 is connected and sealed to the barrier 1 by a frustoconical ring 9. The annular space 11 may be inspected from a walk-on grate 16 provided between the shroud 7 and the tank 8 and protected by a railing 15.

Valves 10 for filling and emptying the tank are disposed in the space 11 and operated by universal joints and shafts 12 from outside the barrier 1. The space 11 is connected by a drain valve 14 to a sewer.

The valve 10 is equipped with an expansion joint 13 which compensates for any relative movements of the metal barrier 1 and the shell of the tank 8 without damage to the associated conduits.

Figure 3:
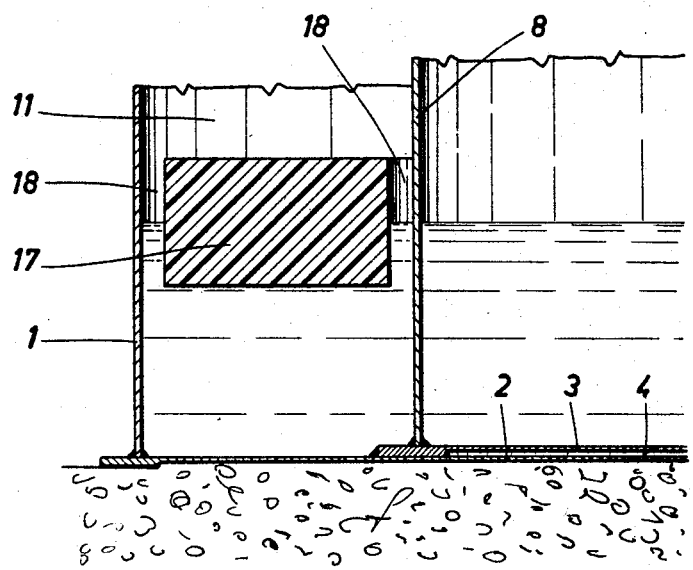
FIG. 3 is a view similar to FIG. 2 showing a modified embodiment.

As is shown in FIG. 3, a non-combustible, annular float 17 may be arranged in the space 11 and separated by gaps 18 from the barrier 1 and the tank shell 8. Any liquid which leaks out of the tank 8 above the float 17 can flow down through the gaps.

The float 17 may be hollow and may be divided into individual float elements. It reduces the free surface of flammable liquid in the space 11 to a minimum.

What we claim is:

1. A storage installation for a flammable liquid comprising, in combination:
    (a) a tank adapted to hold said liquid;
    (b) a solid metallic barrier spacedly surrounding said tank and defining therewith an upwardly open, annular space extending about said tank for receiving liquid leaking from than tank; and
    (c) a float of non-combustible material in said annular space.

2. An installation as set forth in claim 1, wherein said float is spaced from said barrier and said tank.

3. An installation as set forth in claim 1, wherein said float has the shape of a closed ring.

4. An installation as set forth in claim 1, wherein said float is hollow.

5. A storage installation for a flammable liquid comprising, in combination:
    (a) a tank adapted to hold said liquid;
    (b) a solid metallic barrier spacedly surrounding said tank and defining therewith an upwardly open, annular space extending about said tank for receiving liquid leaking from the tank, said barrier having a top rim;
    (c) a shroud having an annular wall of solid metal offset from said barrier in a radially outward direction; and
    (d) a solid ring sealed to said shroud and to said rim and supporting said shroud on said barrier.

6. An installation as set forth in claim 1, further comprising a metallic underfloor extending under said tank and said annular space and supporting said tank, the tank having a bottom wall and a shell upwardly extending from said bottom wall, said barrier extending upwardly from said underfloor, said underfloor and said bottom wall jointly defining a cavity therebetween, and a welded seam connecting said underfloor to said bottom wall along the circumference of the latter and sealing said cavity.

7. An installation as set forth in claim 6, further comprising a leakage indicating device, and a conduit connecting said device to said cavity.

8. An installation as set forth in claim 6, further comprising a conduit extending outward from said tank through said space and said barrier, a portion of said conduit in said space being expandable and constititing means compensating for relative movement of said barrier and of said tank.

9. An installation as set forth in claim 6, further comprising a conduit extending outward from said tank through said space and said barrier, said conduit including valve means in said space for controlling liquid flow through the conduit, and valve actuating means outside said barrier and connected to said valve means for operating the same.

References Cited

UNITED STATES PATENTS

| 2,531,159 | 11/1959 | Rowell | 220—1 |
| 2,986,011 | 5/1961 | Murphy | 220—14 |
| 3,047,184 | 7/1962 | Van Bergen et al. | 220—18 |

FOREIGN PATENTS

| 826,742 | 1/1960 | Great Britain. |

RAPHAEL H. SCHWARTZ, *Primary Examiner.*